United States Patent
Li et al.

(10) Patent No.: US 8,262,918 B1
(45) Date of Patent: Sep. 11, 2012

(54) METHODS OF PRODUCING DAMASCENE MAIN POLE FOR PERPENDICULAR MAGNETIC RECORDING HEAD

(75) Inventors: Yun-Fei Li, Fremont, CA (US);
Ronghui Zhou, Fremont, CA (US);
Guanghong Luo, Fremont, CA (US);
Ming Jiang, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 521 days.

(21) Appl. No.: 12/411,270

(22) Filed: Mar. 25, 2009

(51) Int. Cl.
*B44C 1/22* (2006.01)

(52) U.S. Cl. .......... 216/22; 216/66; 216/88; 216/89; 250/492.3

(58) Field of Classification Search ............ 216/22, 216/66, 88, 89; 450/492.3
See application file for complete search history.

(56) References Cited

U.S. PATENT DOCUMENTS

| | | | |
|---|---|---|---|
| 4,614,563 A * | 9/1986 | Kubo | 216/17 |
| 6,367,146 B1 * | 4/2002 | Han et al. | 29/603.15 |
| 7,444,740 B1 | 11/2008 | Chung et al. | |
| 2002/0034043 A1 | 3/2002 | Okada et al. | |
| 2004/0223258 A1 | 11/2004 | Giorgis et al. | |
| 2005/0024779 A1 | 2/2005 | Le et al. | |
| 2005/0225898 A1 | 10/2005 | Huang et al. | |
| 2006/0002014 A1 | 1/2006 | Sasaki et al. | |
| 2006/0141770 A1 * | 6/2006 | Ryu et al. | 438/633 |
| 2006/0268456 A1 | 11/2006 | Sasaki et al. | |
| 2007/0195457 A1 * | 8/2007 | Matono et al. | 360/126 |
| 2008/0002293 A1 | 1/2008 | Sasaki et al. | |
| 2008/0037181 A1 | 2/2008 | Kamijima | |
| 2008/0088972 A1 | 4/2008 | Sasaki et al. | |
| 2008/0112081 A1 | 5/2008 | Matono | |
| 2008/0253027 A1 | 10/2008 | Yamaguchi et al. | |
| 2008/0253035 A1 * | 10/2008 | Han et al. | 360/319 |
| 2009/0091862 A1 * | 4/2009 | Han et al. | 360/319 |
| 2010/0061016 A1 * | 3/2010 | Han et al. | 360/125.3 |

* cited by examiner

*Primary Examiner* — Shamim Ahmed
*Assistant Examiner* — Bradford Gates

(57) ABSTRACT

Methods of producing magnetic recording heads are disclosed. The methods can include providing a wafer comprising a substrate layer in which are disposed a plurality of damascene trenches. The method can further include depositing a pole material across the whole wafer, wherein the plurality of trenches are filled with the pole material. The methods can further include depositing a mask material over the pole material across the whole wafer. The methods can further include performing a first material removal process across the whole wafer to remove the mask material and a first portion of the pole material at a same material removal rate. The methods can further include performing a second material removal process to remove a second portion of the pole material above the substrate layer.

22 Claims, 5 Drawing Sheets

METHODS OF PRODUCING DAMASCENE MAIN POLE FOR PERPENDICULAR MAGNETIC RECORDING HEAD

FIELD OF THE INVENTION

The present invention generally relates to magnetic recording heads and, in particular, relates to methods of producing damascene main poles for perpendicular magnetic recording (PMR) heads.

BACKGROUND OF THE INVENTION

Damascene processes may be used to "build up" structures for use in a hard drive head, such as a write pole, as opposed to methods which rely upon material removal to form such 3D structures. As applied to formation of PMR writing heads, the damascene process involves forming grooves or trenches in a material, and then depositing (e.g., electroplating) a pole material into the trenches to form write poles. FIG. 1 illustrates a prior art damascene process that relies upon photoresist framing to define an area for pole plating. This process involves: 1) providing a trench with targeted angle and track width via, e.g., a reactive-ion etching (RIE); 2) depositing multiple layers of thin films including a seed (e.g., ruthenium) layer, to build a narrower trench to control the final pole shape and track width; 3) forming a framed pole layer 110 by applying a photo process (e.g., depositing and photo-developing a photoresist material) to open only the device area for the pole material plating, and then filling the trench area that the photo process has created with a pole material (e.g., CoNiFe) via a electroplating process; 4) removing the photoresist material by a photo strip or a field etch process; 5) depositing a chemical-mechanical planarization (CMP) stop layer, (e.g., diamond-like-carbon), after creating an open area on field via another photo process, followed by deposition of alumina; 6) applying a CMP process to planarize the surface on the diamond-like-carbon, while producing dishing at where no diamond-like-carbon exists; and 7) removing the DLC via, e.g., RIE.

This damascene process scheme may suffer from potential photoresist residue problems. As indicated above, to define the framed pole material layer, the area around the pole has to experience a photo process. The photo process introduces a photoresist residue which may remain on a pole side wall after the photo developing. Such photoresist residue can result in poor pole integrity and finishing. Moreover, if a sufficient amount of the photoresist residue remains at the pole bottom, device failures and/or scrapping of wafer can result. In addition, this damascene process scheme may also suffer from the complexity associated with a liftoff process to form the diamond-like-carbon. In this regard, the liftoff process may introduce undesired local topology for CMP, and may not completely remove all of the diamond-like-carbon.

SUMMARY OF THE INVENTION

Various embodiments of the present invention solve the foregoing problems by providing a damascene process that does not involve a photoresist process to define a framed pole structure. Instead, a pole material is deposited over an entire wafer, thereby eliminating the need for applying a photoresist. A mask layer is provided over the pole material layer, and one or more material removal processes are utilized to remove the mask material and the excess pole material, without leaving any photoresist residue. This approach provides a reliable method of forming a PMR head, and can greatly reduce defects and complexity in the wafer processing of PMR heads.

According to one embodiment of the subject disclosure, a method of producing magnetic recording heads can comprise providing a wafer comprising a substrate layer in which are disposed a plurality of damascene trenches. The method can further comprise depositing a pole material across the whole wafer, wherein the plurality of trenches are filled with the pole material. The methods can further comprise depositing a mask material over the pole material across the whole wafer. The methods can further comprise performing a first material removal process across the whole wafer to remove the mask material and a first portion of the pole material at a same material removal rate. The methods can further comprise performing a second material removal process to remove a second portion of the pole material above the substrate layer.

According to another embodiment of the subject disclosure, a method of producing magnetic recording heads can comprise providing a wafer comprising a substrate layer in which are disposed a plurality of damascene trenches. The method can further comprise depositing a polishing stop material over the substrate layer. The method can further comprise depositing a pole material across the whole wafer, whereby the plurality of damascene trenches are filled with the pole material. The method can further comprise depositing a mask material over the pole material across the whole wafer. The mask material can have a same milling rate as the pole material. The method can further comprise performing an ion beam etching across the whole wafer to remove the mask material and a first portion of the pole material at the same milling rate. The method can further comprise performing a chemical-mechanical polishing process to remove a second portion of the pole material above the substrate layer.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
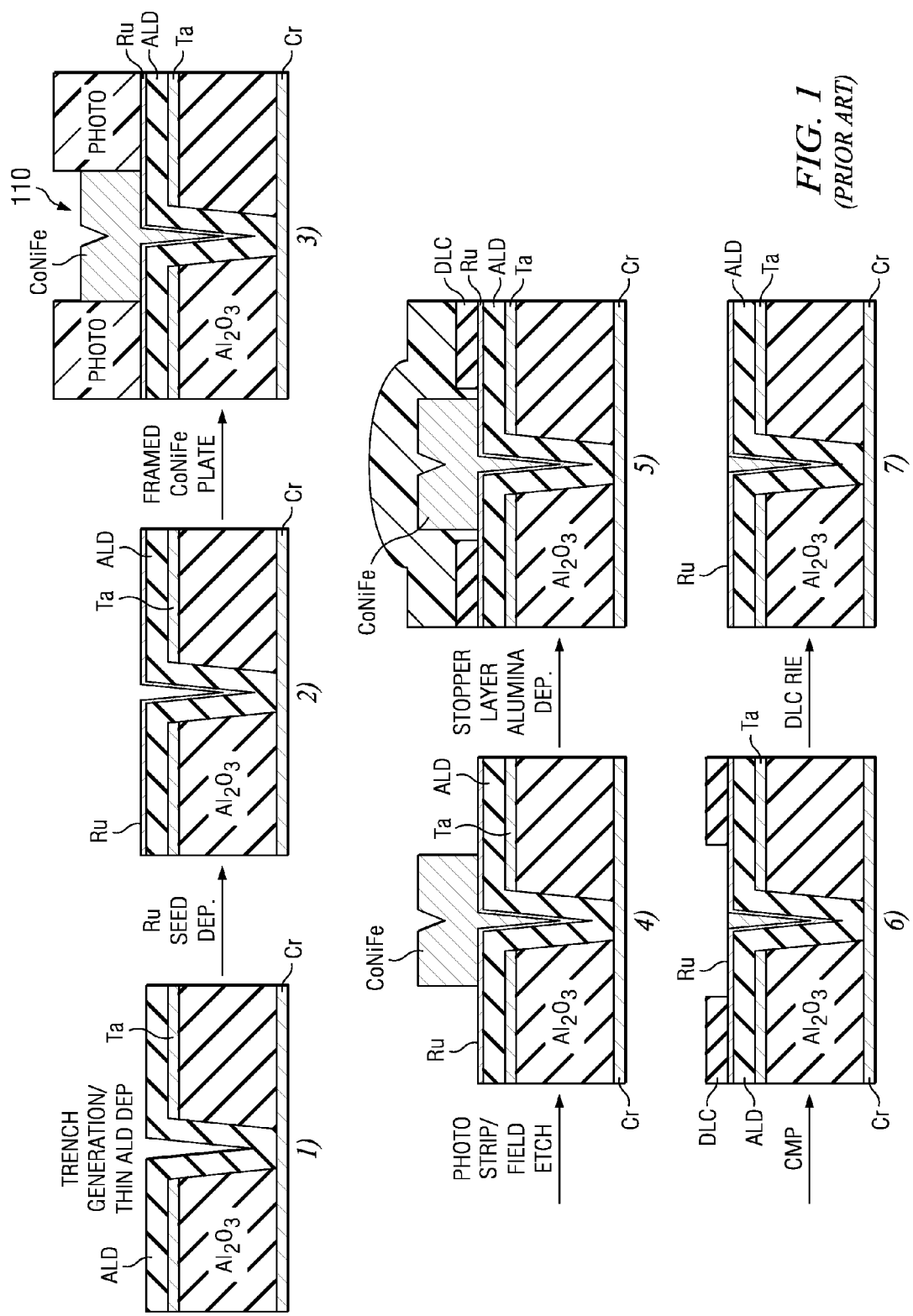
FIG. 1 illustrates a prior art damascene process scheme that involves a photo process for defining a framed pole layer.
Figure 2:
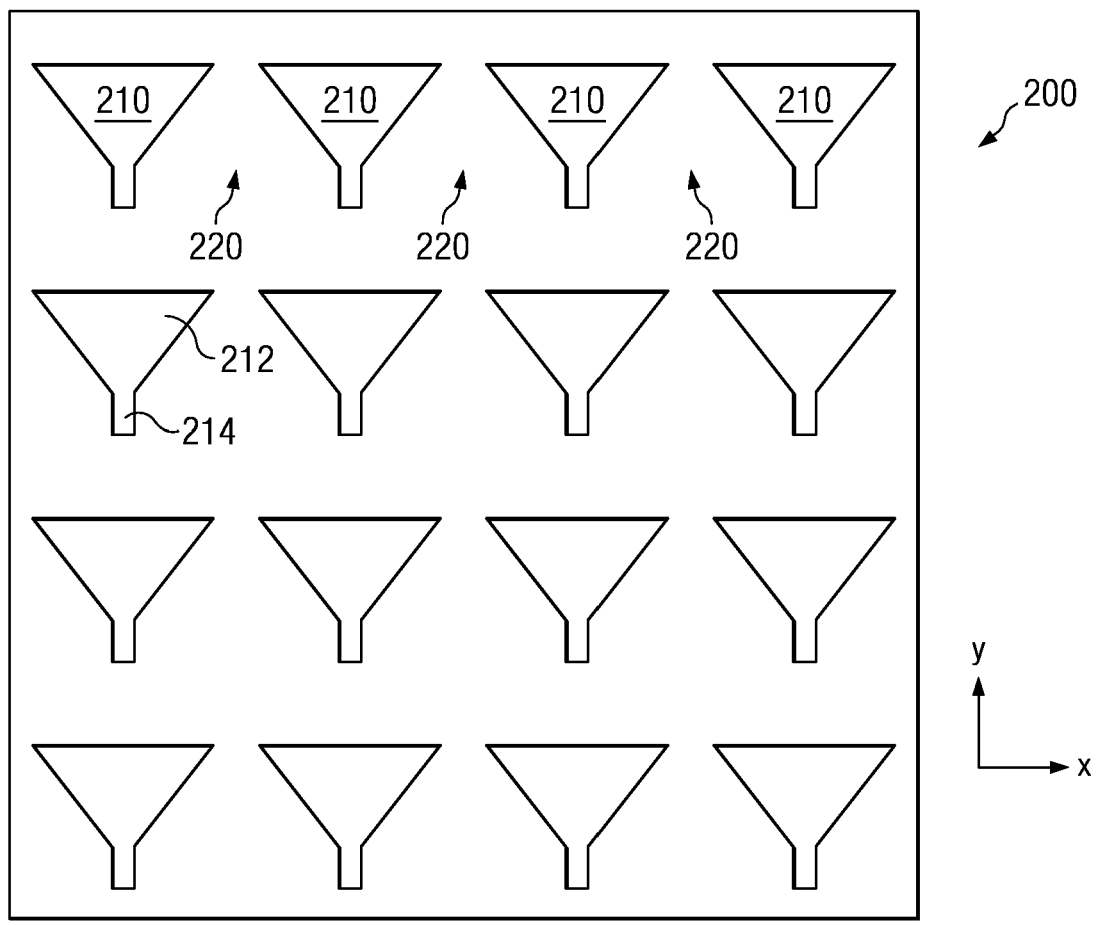
FIG. 2 is a top view of a wafer comprising a plurality of damascene trenches in which main magnetic poles are formed, in accordance with one aspect of the subject disclosure.

A multitude of PMR heads may be simultaneously produced via a wafer fabrication process. FIG. 2 is a top view of a wafer 200 comprising a plurality of damascene trenches 210 formed in one or more layers of materials (e.g., $Al_2O_3$ and Ta) via e.g., a reactive ion etching (RIE). The method by which trenches may be provided in a substrate are well known to those of skill in the art, and are omitted herefrom for the sake of brevity. Each of the damascene trenches comprises an upper pole section 212 and a relatively narrow pole tip section 214. After the trenches are formed, the wafer, viewed from the top, comprises trenched areas 210 and remaining field areas 220. The field areas are substantially planar. In those cases in which the trenches have a "V"-shaped cross section when viewed, e.g., from y direction, the trenched areas are sloped at least in some sections thereof.

Figure 3:
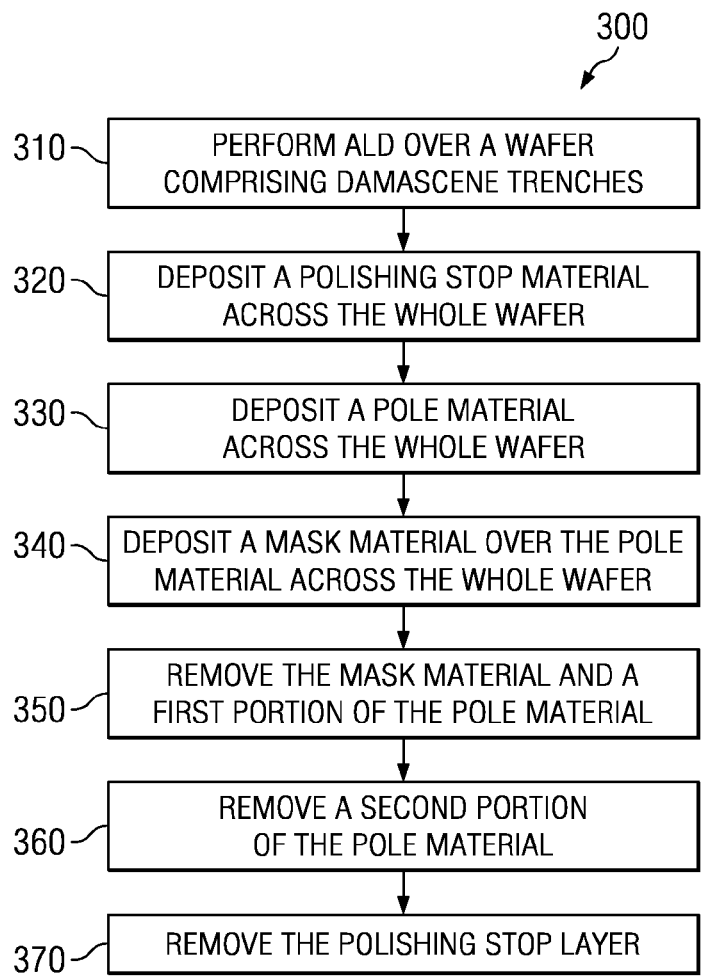
FIG. 3 is a flowchart illustrating an exemplary fabrication process for producing a plurality of PMR heads on a wafer, in accordance with one aspect of the present disclosure.
Figure 4A:
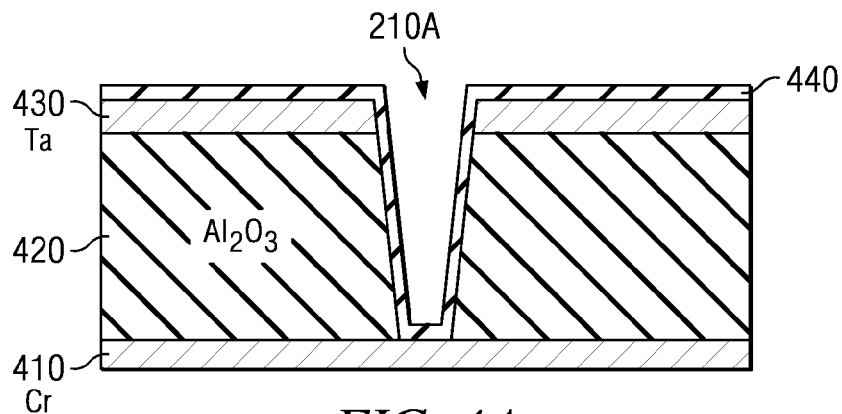
FIGS. 4A-G are a series of figures representing intermediate structures resulting from different processing steps of the exemplary wafer fabrication process, in accordance with one aspect of the subject disclosure.

FIG. 3 is a flowchart illustrating an exemplary fabrication process 300 for producing a plurality of PMR heads on a wafer, such as the wafer 200 shown in FIG. 2, in accordance with one aspect of the present disclosure. FIGS. 4A-G are a series of figures representing intermediate structures arrived after each of different processing steps (e.g., steps 310-370) of the exemplary wafer fabrication process 300. The process 300 begins at a step 310, in which atomic layer deposition (ALD) is performed over a wafer comprising a plurality of damascene trenches, such as the damascene trenches 210 (FIG. 2), to form a thin insulating layer 440 comprising an insulator (e.g., $Al_2O_3$) as shown in FIG. 4A. Prior to the ALD, the wafer comprises a first layer 410, a second layer 420, a third layer 430, and a plurality of damascenes trenches disposed in the second and third layers 420, 430. The first layer 410 is shown to be chromium (Cr), but the layer may be formed of another metal including ruthenium (Ru). The second layer 420 is shown to be $Al_2O_3$, but may be formed of another insulating material including silicon oxide ($SiO_2$). The third layer 430 is shown to be tantalum (Ta), but may be formed of another metal including, but is not limited to, ruthenium (Ru), nickel-iron (NiFe), or titanium (Ti). The thickness of the thin insulating layer 440 is selected to provide a target angle and/or track width for the trench. After the ALD, the wafer comprises a plurality of damascene trenches such as a damascene trench 210A disposed in the second, third, and thin insulating layers 420, 430, 440.

Figure 4B:
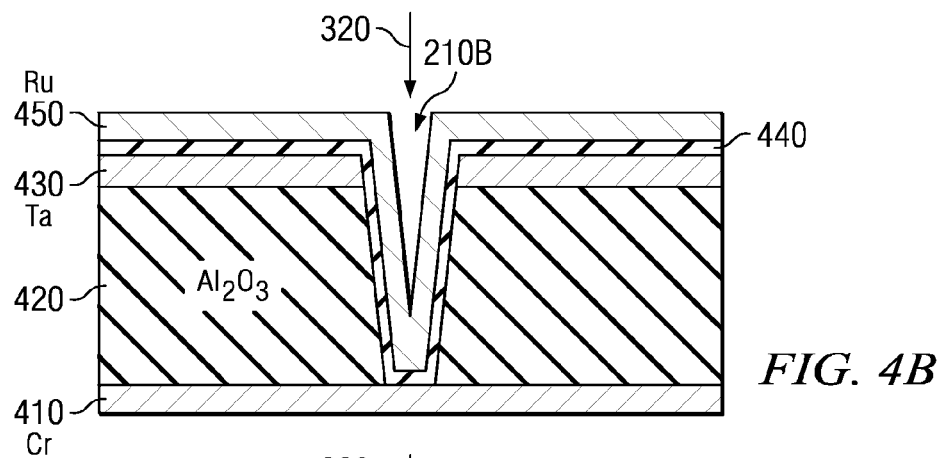

The process 300 proceeds to step 320, in which a polishing stop material is deposited across the whole wafer, including into the plurality of damascene trenches such as the damascene trench 210A to form a polishing stop layer 450 as illustrated in FIG. 4B. As used herein, the term "deposition" refers to any process that grows, coats, or otherwise transfers a material onto the wafer. Non-limiting examples of deposition processes include physical vapor deposition (PVD), chemical vapor deposition (CVD), electrochemical deposition (ECD), molecular beam epitaxy (MBE), atomic layer deposition (ALD). The polishing stop layer 450 is used for stopping a polishing process such as a chemical-mechanical polishing (CMP) process, as is described in greater detail below. The polishing stop layer 450 is also used as a seed layer for electroplating the pole material. The polishing stop material can be advantageously chosen to fulfill these dual functions. In the illustrated example, the polishing stop material is shown to be ruthenium (Ru), but the layer may be formed of another metal or alloy including, but is not limited to, Cr, Ta, Ti, and/or tungsten (W). After deposition of the polishing stop material, the wafer comprises a plurality of damascene trenches such as a damascene trench 210B disposed in the second, third, thin insulating, and polishing stop layers 420, 430, 440, 450.

Figure 4C:
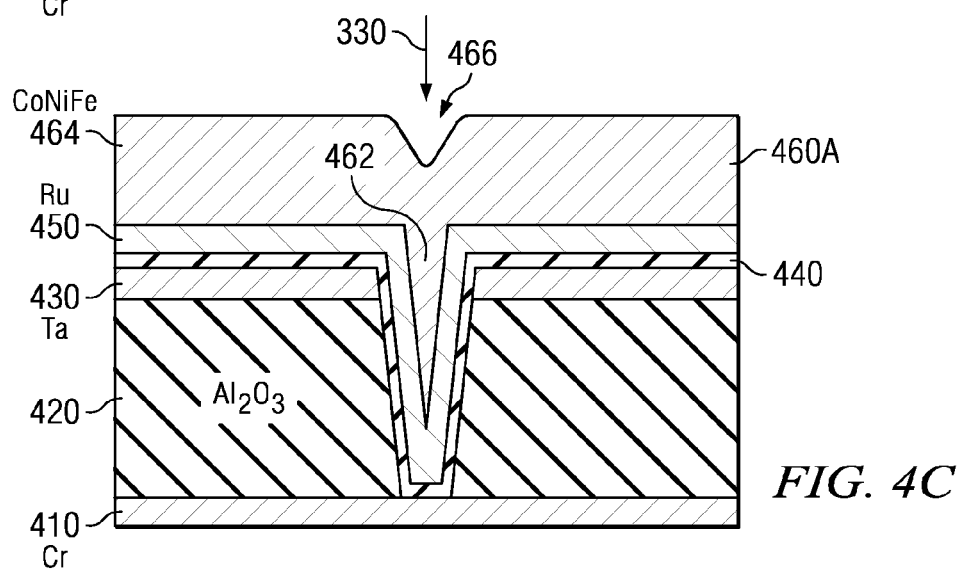

The process 300 proceeds to a step 330, in which a pole material is deposited over the polishing stop layer 450 across the whole wafer as illustrated in FIG. 4C. For the purpose of illustration, the deposited pole material is classified into two parts: 1) a first pole material 462 filling a plurality of damascene trenches such as the damascene trench 210B; and 2) a second pole material 464 deposited over the polishing stop layer 450 to form a pole layer 460A. The pole material 462, 464 can be any soft magnetic material having a high magnetic moment, e.g., in excess of 2.0 T. In the illustrated example, the pole material is cobalt nickel iron (CoNiFe), but the pole material can be, for example, a material comprising one or more elements selected from the group consisting of cobalt (Co), nickel (Ni), iron (Fe), or any combination thereof (e.g., CoFe, NiFe) Following deposition, the upper surface of the pole material layer 460A may have a plurality of depressions such as a depression 466 above the corresponding damascene trenches (e.g., the damascene trench 210B).

Figure 4D:
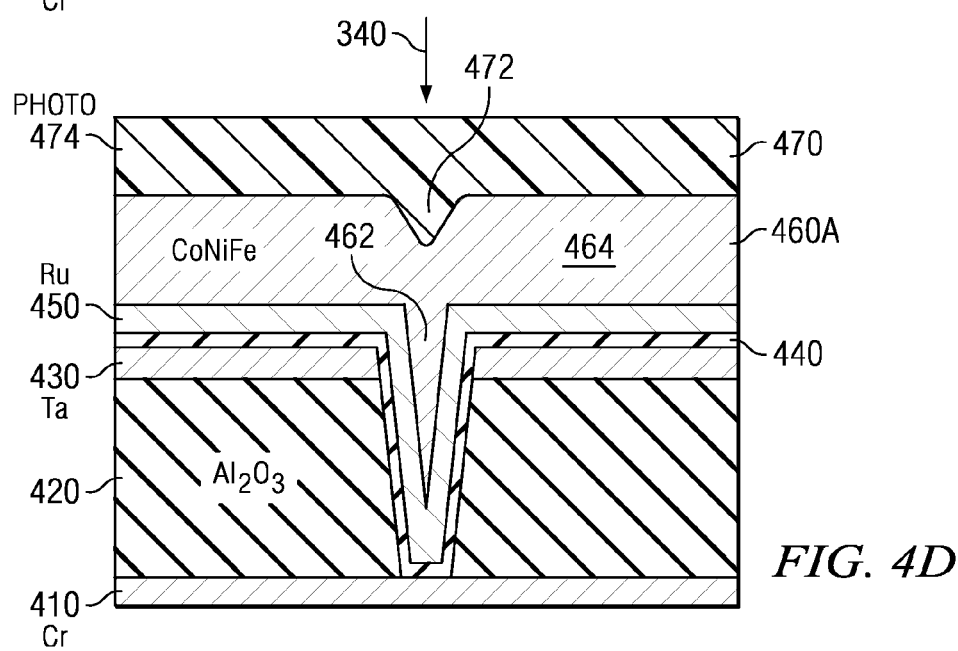
Figure 4E:
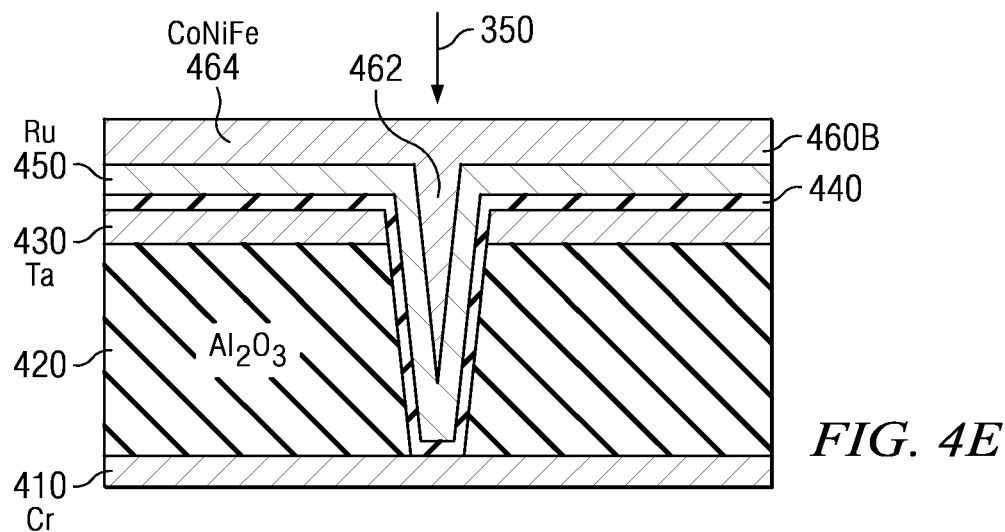

The process 300 proceeds to step 340, in which a mask material is deposited over the pole layer 460A across the whole wafer as illustrated in FIG. 4D. For the purpose of illustration, the deposited mask material is classified into two parts: 1) a first mask material 472 filling a plurality of depressions such as the depression 466; and 2) a second mask material 474 deposited over the pole layer 460A to form a mask layer 470. In the illustrated example, the upper surface of the mask layer 470 is substantially planar, e.g., free of depressions such as the depression 466 found on top of the pole layer. In this regard, the deposition of the mask material acts to planarize the wafer structure prior to subjecting the wafer to subsequent material removal processes. In the illustrated example, the mask material is a photoresist material such as polymethylmethacrylate (PMMA) or polymethylglutarimide (PMGA), but the mask material may be any other material that can be coated onto the upper surface of the pole layer 460A to form a substantially planar upper surface (e.g., by filling in the depressions 466). In certain embodiments, the mask material (e.g., PMMA or PMGA) is spin coated onto the pole layer 460A using a spin-coater. In certain embodiments, the deposited mask material is subjected to a further processing such as a bake process, a curing process (e.g., UV-curing), or both, to control its material removal rate as described below.

The process 300 proceeds to a step 350, in which a first material removal process is performed across the whole wafer to remove the mask material 470 deposited in the step 340 and a first portion of the second pole material 464 deposited in the step 330. This may be more easily understood with reference to FIG. 4E. As used herein, the term "removal" refers to any process that removes a material from the wafer. Non-limiting examples of removal processes include a milling process such as an ion beam etching (IBE), e.g., reactive ion etching (RIE); and a polishing process such as chemical-mechanical polishing (CMP). In certain embodiments, the first material removal process is performed using a milling process such as an IBE process In some of such embodiments, one or more parameters associated with the IBE process and/or the mask material are selected or adjusted to achieve a substantially same milling rate for the mask material and the pole material. By having the substantially same milling rate, the planarity of an upper surface of the wafer is maintained during the first material removal process, e.g., by removing the first mask material 472 and the second pole material 464 surrounding the first mask material 472 at the same removal rate. The same milling rate between the mask material and the pole material can be achieved in various different ways including: 1) selecting an angle of the IBE process; 2) selecting a power of the IBE process; 3) adjusting one or more properties of the mask and/or pole materials, and any combination thereof.

For example, in accordance with one aspect of the subject disclosure, the angle of an IBE process may be selected to provide a material removal rate for the mask material which is substantially the same as a material removal rate for the pole material. Similarly, the power of an IBE process may be selected to provide a material removal rate for the mask material which is substantially the same as a material removal rate for the pole material. One skilled in the art shall appreciate in view of the present disclosure that such functions can be experimentally or theoretically established. Adjusting the one or more properties of the mask material can involve configuring a bake process or a curing (e.g., UV) process by which the material removal rate of the mask material is adjusted. For example, the bake process or the curing process can be carried out under such conditions (e.g., intensity, temperature) and/or a duration so as to yield a substantially same milling rate for the mask material and the pole material. In some embodiments, a combination of some of these and other adjustable parameters affecting a material removal rate of one or both of the mask and pole materials can be performed to achieve the same material removal rate. At the end of the first material removal process, a remainder pole layer 460B comprising a remainder portion of the second pole material 464 is formed, wherein the upper surface of the remainder pole layer 460B is substantially planar, e.g., within +/−10 nm.

Figure 4F:
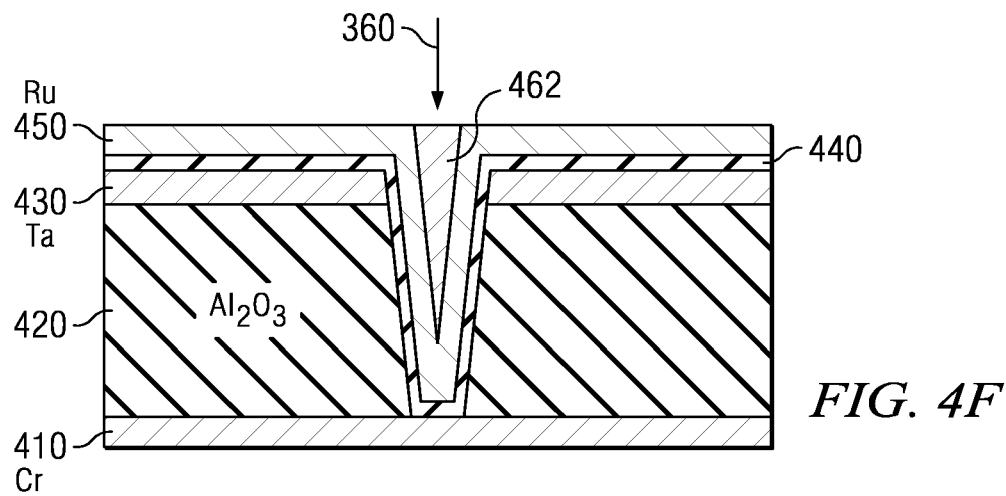

The process 300 proceeds to a step 360, in which a second material removal process is performed across the whole wafer to remove the remainder pole layer 460B from over the polishing stop layer 450 as illustrated in FIG. 4F. In certain embodiments, the second material removal process is performed using a polishing process such as a CMP process. The CMP process can be carried out until the remainder portion of the second pole material 464 above the polishing stop layer 450 is completely removed, e.g., by applying the CMP process for a predetermined time under predetermined conditions, or until the polishing stop layer is detected (e.g., by a change in polishing rate, or with any other end-point detection mechanism known to those of skill in the art).

Figure 4G:
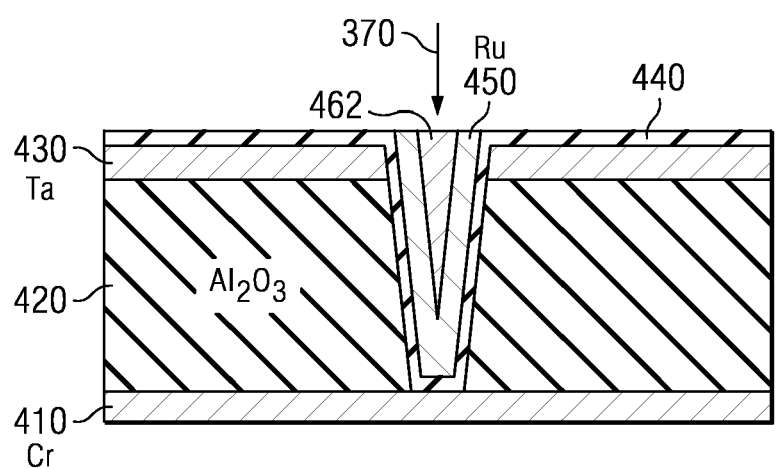

The process 300 proceeds to a step 370, in which the polishing stop layer 450 above the thin insulating layer 440 is removed along with a portion of the first pole material 462 above the thin insulating layer 440 by, e.g., a reactive ion etching (RIE) process as illustrated by FIG. 4G.

As a result of the foregoing method, the write pole is free from photoresist residue, and has a substantially planar upper surface co-planar with an upper surface of the insulating layer.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A method of producing magnetic recording heads, the method comprising:
    providing a wafer comprising a substrate layer in which are disposed a plurality of damascene trenches;
    depositing a pole material across the whole wafer, whereby the plurality of trenches are filled with the pole material;
    depositing a mask material over the pole material across the whole wafer;
    performing a first material removal process across the whole wafer to remove the mask material and a first portion of the pole material at a same material removal rate, wherein the first material removal process comprises an etching process; and
    performing a second material removal process to remove a second portion of the pole material above the substrate layer, wherein the second material removal process comprises a polishing process.

2. The method of claim 1, wherein the pole material is deposited via an electroplating process.

3. The method of claim 1, wherein depositing the pole material forms a pole layer across the whole wafer, the pole layer having an upper surface comprising a plurality of depressions above the corresponding plurality of damascene trenches.

4. The method of claim 3, wherein the mask material fills in the plurality of depressions in the upper surface of the pole layer.

5. The method of claim 1, wherein the pole material comprises an element selected from the group consisting of cobalt (Co), nickel (Ni), and iron (Fe).

6. The method of claim 1, wherein depositing the mask material forms a mask layer having an upper surface that is substantially planar.

7. The method of claim 1, wherein depositing the mask material comprises spin coating a photoresist onto the pole material.

8. The method of claim 1, wherein the first material removal process comprises an ion beam etching process.

9. The method of claim 8, wherein an angle of the ion beam etching process is selected to provide the same milling rate for the mask material and the pole material.

10. The method of claim 8, wherein a power of the ion beam etching process is selected to provide the same milling rate for the mask material and the pole material.

11. The method of claim 1, wherein the first material removal process is configured to provide the same material removal rate at least in part by adjusting one or more properties of the mask material.

12. The method of claim 11, wherein adjusting the one or more properties of the mask material comprises configuring a bake process by which the material removal rate of the mask material is adjusted.

13. The method of claim 11, wherein adjusting the one or more properties of the mask material comprises configuring a curing process by which the material removal rate of the mask material is adjusted.

14. The method of claim 1, wherein the second material removal process comprises a chemical-mechanical polishing process.

15. The method of claim 14, further comprising depositing a polishing stop material prior to depositing the pole material.

16. The method of claim 15, wherein the polishing stop material is selected from the group consisting of ruthenium (Ru), chromium (Cr), titanium (Ti), and tungsten (W).

17. The method of claim 15, wherein the polishing stop material functions as a seed material for electroplating the pole material.

18. The method of claim 15, wherein the polishing process is terminated after the pole material deposited above the polishing stop material is removed.

19. The method of claim 1, wherein the method does not include developing a photoresist to pattern the pole material.

20. The method of claim 1, wherein the etching process is selected from the group consisting of an ion beam etching process and a reactive ion etching process.

21. A method of producing magnetic recording heads, the method comprising:
- providing a wafer comprising a substrate layer in which are disposed a plurality of damascene trenches;
- depositing a polishing stop material over the substrate layer;
- depositing a pole material across the whole wafer, whereby the plurality of damascene trenches are filled with the pole material;
- depositing a mask material over the pole material across the whole wafer, the mask material having a same milling rate as the pole material;
- performing a ion beam etching across the whole wafer to remove the mask material and a first portion of the pole material at the same milling rate; and
- performing a chemical-mechanical polishing process to remove a second portion of the pole material above the substrate layer.

22. The method of claim 21, further comprising removing the polishing stop material after performing the chemical-mechanical polishing process.

* * * * *